US007729089B1

(12) United States Patent
Hogan

(10) Patent No.: US 7,729,089 B1
(45) Date of Patent: Jun. 1, 2010

(54) HEAD-GIMBAL ASSEMBLY INCLUDING A FLEXURE TONGUE WITH STAND-OFFS ARRANGED TO FACILITATE LATERAL LIGHT ENTRY

(75) Inventor: John W. Hogan, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 614 days.

(21) Appl. No.: 11/580,542

(22) Filed: Oct. 13, 2006

(51) Int. Cl.
  *G11B 5/60* (2006.01)
(52) U.S. Cl. .............................. 360/234.6; 360/245.3
(58) Field of Classification Search .............. 360/234.6, 360/245.3
  See application file for complete search history.

(56) References Cited

U.S. PATENT DOCUMENTS

| 4,700,250 | A |   | 10/1987 | Kuriyama |           |
|-----------|---|---|---------|----------|-----------|
| 5,027,238 | A |   | 6/1991  | Konishi et al. |     |
| 5,467,236 | A |   | 11/1995 | Hatanai et al. |     |
| 5,711,063 | A |   | 1/1998  | Budde et al. |       |
| 5,781,379 | A |   | 7/1998  | Erpelding et al. |   |
| 5,786,961 | A |   | 7/1998  | Goss |               |
| 5,880,908 | A | * | 3/1999  | Shiraishi et al. ......... 360/234.6 |
| 5,896,248 | A |   | 4/1999  | Hanrahan et al. |    |
| 5,956,209 | A |   | 9/1999  | Shum |               |
| 6,078,472 | A | * | 6/2000  | Mitoh et al. ............. 360/245.4 |
| 6,125,014 | A |   | 9/2000  | Riedlin, Jr. |        |
| 6,282,063 | B1| * | 8/2001  | Coon ...................... 360/245.3 |
| 6,313,972 | B1|   | 11/2001 | Williams et al. |    |
| 6,349,017 | B1| * | 2/2002  | Schott .................... 360/234.6 |
| 6,351,354 | B1|   | 2/2002  | Bonin |              |
| 6,459,549 | B1|   | 10/2002 | Tsuchiya et al. |    |
| 6,552,875 | B1| * | 4/2003  | Le et al. ................. 360/234.6 |
| 6,741,426 | B2|   | 5/2004  | Girard |             |
| 6,788,498 | B1|   | 9/2004  | Bjorstrom et al. |   |
| 6,801,398 | B1|   | 10/2004 | Ohwe et al. |        |
| 6,920,014 | B2|   | 7/2005  | Sato et al. |        |
| 6,920,019 | B2|   | 7/2005  | Martin et al. |      |
| 6,947,258 | B1|   | 9/2005  | Li |                 |
| 6,950,288 | B2| * | 9/2005  | Yao et al. ................ 360/294.4 |
| 6,965,499 | B1|   | 11/2005 | Zhang et al. |       |
| 7,002,780 | B2| * | 2/2006  | Rancour et al. ......... 360/234.6 |
| 7,006,330 | B1|   | 2/2006  | Subrahmanyam et al. |   |
| 7,095,590 | B2| * | 8/2006  | Motonishi et al. ........ 360/234.6 |
| 7,474,508 | B1| * | 1/2009  | Li et al. .................. 360/245.2 |
| 2001/0053050 | A1 |   | 12/2001 | Crane et al. |    |
| 2004/0070880 | A1 |   | 4/2004  | Fu et al. |       |
| 2004/0075946 | A1 |   | 4/2004  | Motonishi et al. |    |
| 2005/0078416 | A1 |   | 4/2005  | Shiraishi et al. |    |
| 2006/0203389 | A1 | * | 9/2006  | Motonishi ................ 360/234.6 |

FOREIGN PATENT DOCUMENTS

JP    61-160823   A2    7/1986

(Continued)

*Primary Examiner*—Jefferson Evans

(57) ABSTRACT

A head-gimbal assembly (HGA) is disclosed. The HGA comprises a head including a slider having a leading end and a trailing end that define a slider length. The head further includes a read transducer disposed at the trailing end. The HGA further comprises an adhesive material and a flexure that includes a tongue to which the head is adhered. The tongue includes three stand-offs in contact with the slider, each of the three stand-offs spanning a stand-off length that is one-half the slider length or less. Two of the three stand-offs are disposed adjacent the leading end.

6 Claims, 3 Drawing Sheets

FOREIGN PATENT DOCUMENTS

| | | |
|---|---|---|
| JP | 05-128771 A2 | 5/1993 |
| JP | 05-144207 A2 | 6/1993 |
| JP | 07-169224 A2 | 7/1995 |
| JP | 2000-123515 A2 | 4/2000 |
| JP | 2001-043647 A2 | 2/2001 |
| JP | 2006-252657 A * | 9/2006 |

* cited by examiner

HEAD-GIMBAL ASSEMBLY INCLUDING A FLEXURE TONGUE WITH STAND-OFFS ARRANGED TO FACILITATE LATERAL LIGHT ENTRY

FIELD OF THE INVENTION

The present invention relates generally to information storage devices, and in particular to stand-off arrangements on flexure tongues of head-gimbal assemblies.

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The head stack assembly typically includes an actuator, at least one head gimbal assembly (HGA), and a flex cable assembly. During operation of the disk drive, the actuator must rotate to position the HGAs adjacent desired information tracks on the disk. The actuator includes a pivot bearing cartridge to facilitate such rotational positioning. One or more actuator arms extend from the actuator body. An actuator coil is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk dive is not in use.

Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface.

The HGA includes a flexure that includes a tongue to which the head is adhered. The adhesive must cure after the head is aligned within close proximity to the tongue. Light-curable adhesives may be used in this application, however the space between the head and the tongue is narrow and does not easily allow the entry of adequate light for adhesive curing.

Thus, there is a need in the art for an improved flexure design that facilitates increased access for UV light to reach the slider bonding adhesive during assembly.

SUMMARY

A head-gimbal assembly (HGA) is disclosed. The HGA comprises a head including a slider having a leading end and a trailing end that together define a slider length. The head further includes a read transducer disposed at the trailing end. The HGA further comprises an adhesive material and a flexure. The flexure includes a tongue to which the head is adhered. The tongue includes three stand-offs in contact with the slider, each of the three stand-offs spanning a stand-off length that is one-half the slider length or less. Two of the three stand-offs are disposed adjacent the leading end.

DESCRIPTION OF THE PREFERRED EMBODIMENTS

Figure 1:
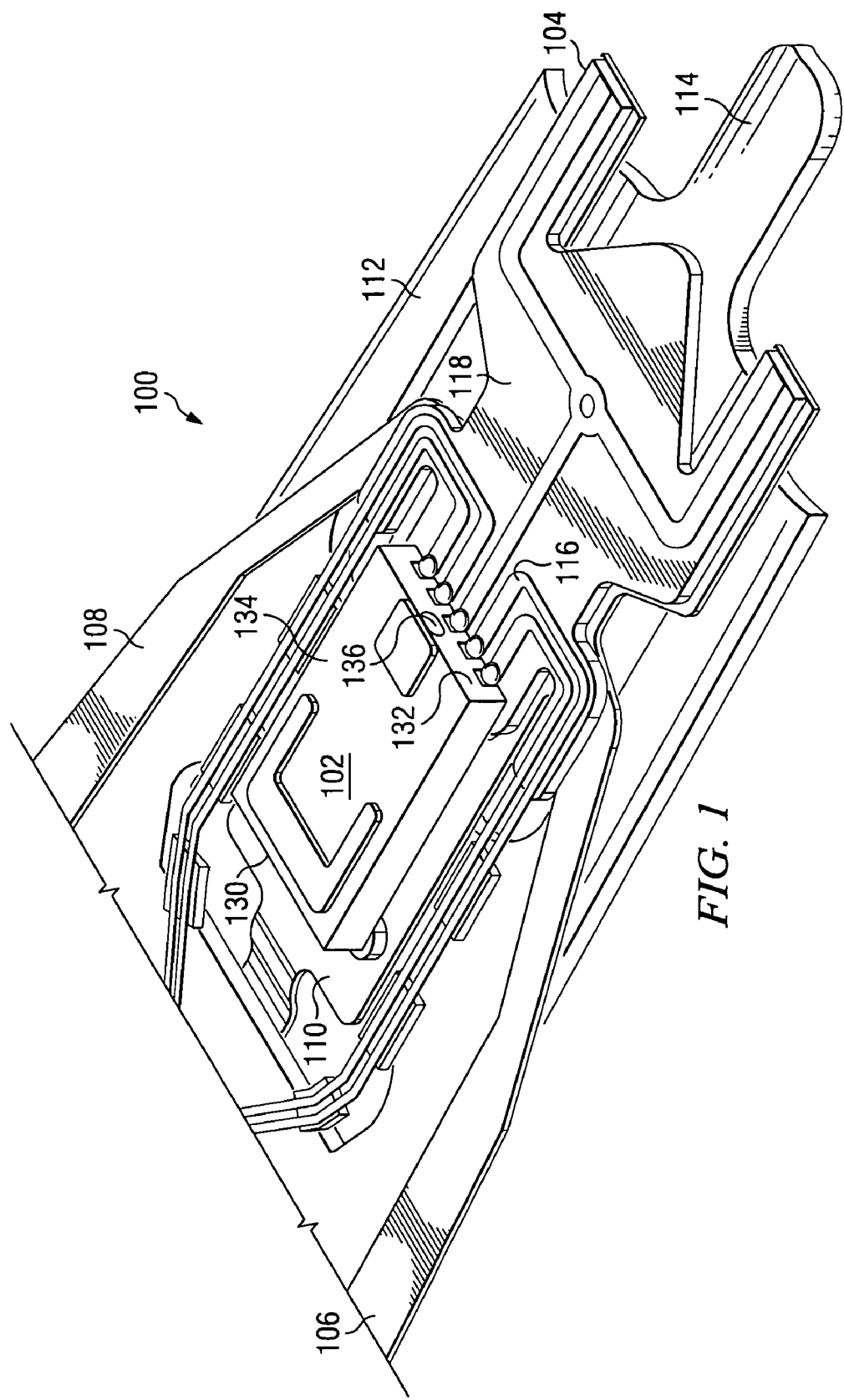
FIG. 1 depicts a head gimbal assembly (HGA) according to an embodiment of the present invention.
Figure 2:
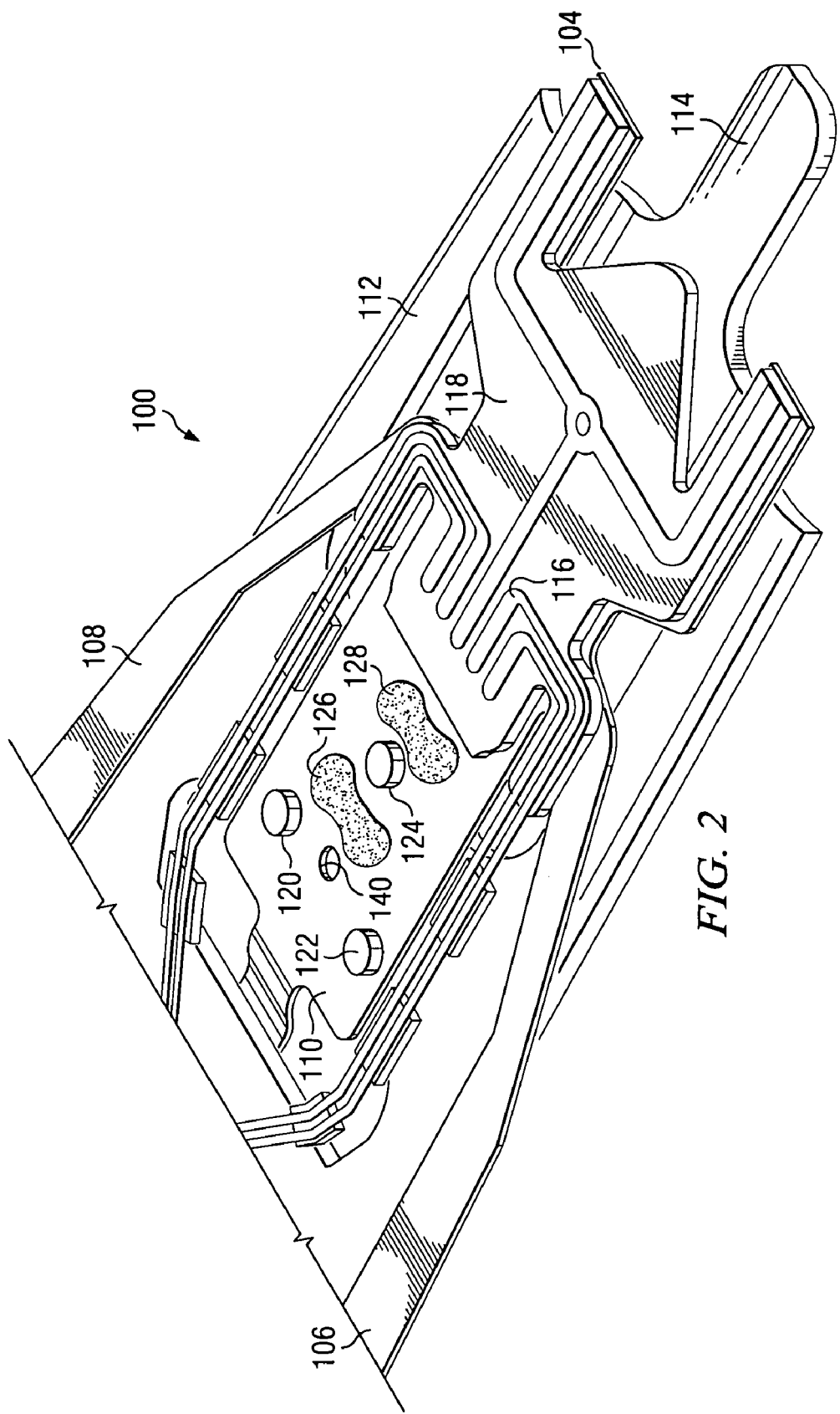
FIG. 2 depicts the HGA of FIG. 1 except with the head removed.

FIGS. 1 and 2 depict a head-gimbal assembly (HGA) 100 according to an exemplary embodiment of the present invention. HGA 100 includes a head 102 that is comprised of a slider 134 and a transducer 136. The slider is typically cut from a ceramic wafer, for example from an alumina titanium carbide wafer, and has a leading end 130 and a trailing end 132. The transducer 136 is disposed at the trailing end 132. For example, the transducer 136 may include a magnetic writer of a longitudinal or perpendicular design, and a read transducer that might be inductive or magnetoresistive, and/or the transducer might read or write by optical means. The distance between leading end 130 and a trailing end 132 defines the slider length.

HGA 100 also includes a load beam 112 that provides lateral stiffness and a vertical preload to the structure of HGA 100. The load beam 112 may be fabricated from stainless steel, and may include a lift tab 114 for loading (or unloading) the head 102 onto (or away from) a surface of the data storage media. In magnetic disk drive applications, the data storage media could be a spinning hard magnetic disk, for example.

HGA 100 also includes a flexure 104. The flexure 104 includes a tongue 110 to which the head 102 is adhered, and two outrigger beams 106, 108 that provide flexibility to allow the tongue 110 to pitch and roll without excessive associated torques. The tongue 110, and the outrigger beams 106 and 108, may be fabricated from a stainless steel layer of the flexure 104. In certain embodiments, the tongue 110 may further include at least one through-hole such as through-hole 140, for example to facilitate the vertical entry of ultraviolet light through the tongue 110 for adhesive curing. Note that the term "vertical entry," as used herein, is not intended to denote any specific direction with respect to gravity. For example, in the embodiment of FIGS. 1 and 2, any light transmission that is normal to the tongue 110 would be considered to be a "vertical entry" (even if it were horizontal with respect to gravity), and any light transmission that is parallel to the tongue 110 would be considered to be a lateral entry.

The flexure 104 also includes electrically conductive traces 116 that may be fabricated from a conductive layer of the flexure 104 via a subtractive process such as etching. Alternatively, the electrically conductive traces 116 may be fabricated via an additive process comprise copper, for example.

The flexure 104 also includes three stand-offs 120, 122, and 124 in contact with the slider 134. Two of the standoffs, namely standoff 120 and standoff 122, are adjacent the leading end 130. Each of the three stand-offs 120, 122, and 124 spans a stand-off length, measured in the same direction as the slider length, that is one-half the slider length or less, for example to facilitate the entry of ultraviolet light from the side for adhesive curing. In certain embodiments, the stand-offs 120, 122, and 124 may be fabricated via a subtractive process from dielectric and conductive layers of the flexure 104. For example, the stand-offs 120, 122, and 124 may be fabricated from a dielectric polyimide layer 118 of flexure 104, or may include material from both a polyimide layer and a copper layer. In such embodiments, the height of the stand-offs 120, 122, and 124 would be determined by the thicknesses of the corresponding layers of flexure 104. For example, the flexure 104 may employ a dielectric layer thickness in the range 5-15 microns, and may employ a conductive layer thickness in the range 8-20 microns. The stand-offs 120, 122, and 124 may serve to maintain a minimum separation between the tongue 110 and the head 102, such minimum separation being determined by the height of the stand-offs.

In certain embodiments, one of the three stand-offs is disposed approximately mid-way between the leading end and the trailing end. For example, in the embodiment of FIGS. 1-2, standoff 124 is disposed approximately mid-way between the leading end and the trailing end (e.g. within 25 microns of the center of slider 134).

In certain embodiments, at least one of the three stand-offs is circular in shape to enhance the utility of the standoff as an alignment feature during HGA assembly. For example, in the embodiment of FIGS. 1-2, all three standoffs 120, 122, and 124 are optionally circular in shape.

HGA 100 also includes adhesive material 126, 128 adhering the head 102 to the tongue 110. Preferably, the adhesive material 126, 128 is of a type that cures faster when exposed to light such as ultraviolet (UV) light. The adhesive material 126, 128 may comprise an epoxy material, such as Norland UV 123 for example. The epoxy material may include a conductivity-enhancing dopant such as a silver dopant, however from a process perspective it may be preferred to avoid the use of such a dopant because such dopants may interfere with the transmission of ultraviolet light.

Figure 3:
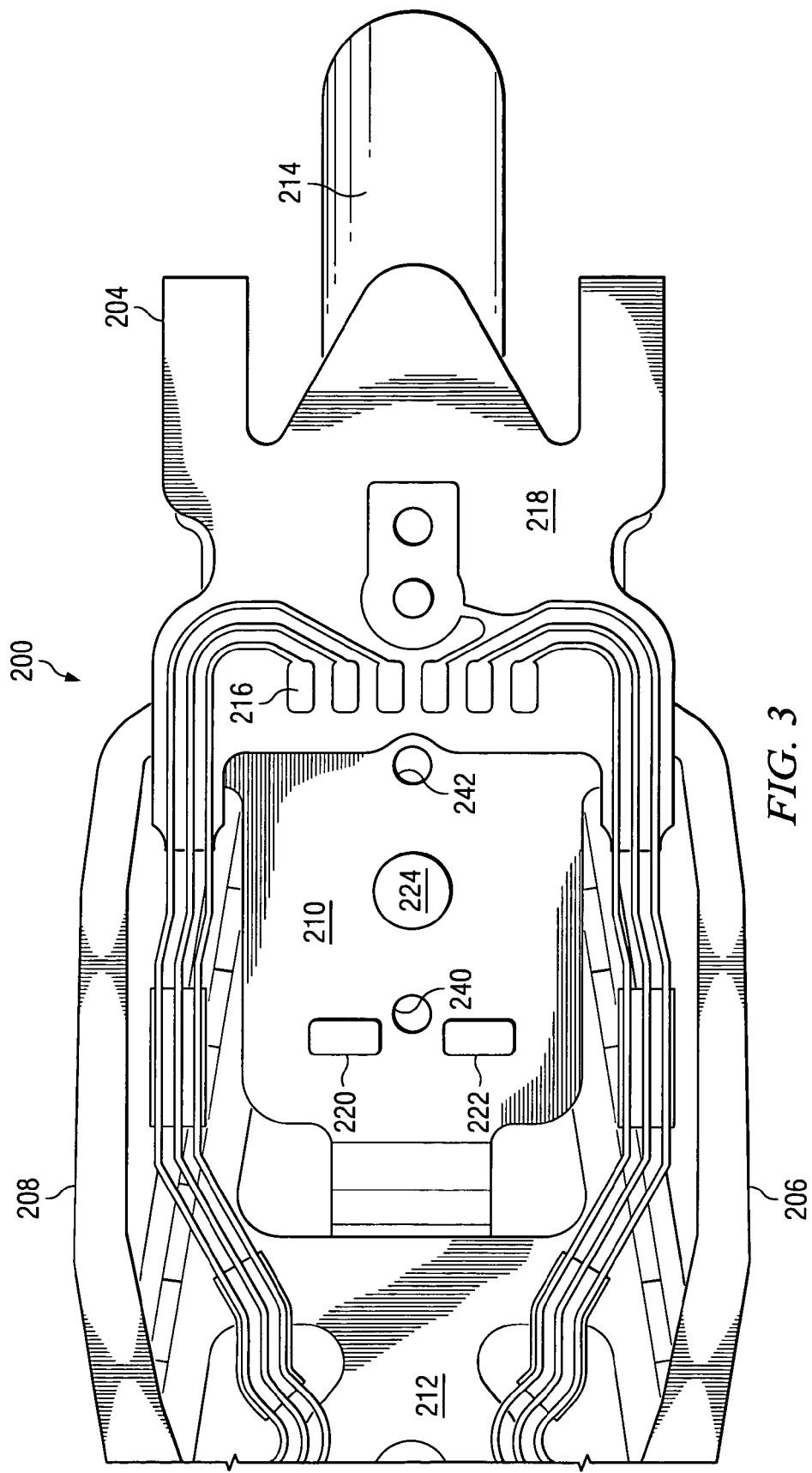
FIG. 3 depicts a HGA according to another embodiment of the present invention.

FIG. 3 depicts an HGA 200 according to another exemplary embodiment of the present invention. HGA 200 includes a load beam 212 that provides lateral stiffness and a vertical preload to the structure of HGA 200. The load beam 212 may be fabricated from stainless steel and may include a lift tab 214.

HGA 200 also includes a flexure 204. The flexure 204 includes a tongue 210 and two outrigger beams 206, 208 that provide flexibility to allow the tongue 210 to pitch and roll without excessive associated torques. The tongue 210, and the outrigger beams 206 and 208, may be fabricated from a stainless steel layer of the flexure 204. The tongue 210 also includes an adhesive material (not shown) for adhering a head such as head 102. Preferably, the adhesive material is of a type that cures faster when exposed to light such as UV light. In certain embodiments, the tongue 210 may further include at least one through-hole such as through-holes 240 and 242, for example to facilitate the transmission of ultraviolet light through the tongue 210 for adhesive curing.

The flexure 204 also includes electrically conductive traces 216 that may be fabricated from a conductive layer of the flexure 204 via a subtractive process such as etching. Alternatively, the electrically conductive traces 216 may be fabricated via an additive process such as deposition of a conductive layer onto the flexure 204. The conductive layer may comprise copper, for example.

The flexure 204 also includes three stand-offs 220, 222, and 224 in contact with the slider such as slider 134. Two of the standoffs, namely standoff 220 and standoff 222, are adjacent the leading end of the slider. Each of the three stand-offs 220, 222, and 224 spans a stand-off length, measured in the same direction as the slider length, that is one-half the slider length or less, for example to facilitate the entry of ultraviolet light from the side for adhesive curing. In certain embodiments, the stand-offs 220, 222, and 224 may be fabricated via a subtractive process from dielectric and conductive layers of the flexure 204. For example, the stand-offs 220, 222, and 224 may be fabricated from a dielectric polyimide layer 218 of flexure 204, or may include material from both a polyimide layer and a copper layer.

In certain embodiments, one of the three stand-offs is disposed approximately mid-way between the leading end and the trailing end of a slider. For example, in the embodiment of FIG. 3, standoff 224 is disposed approximately mid-way between the leading end and the trailing end (e.g. within 25 microns of the slider's center).

In certain embodiments, at least one of the three stand-offs is circular in shape to enhance the utility of the standoff as an alignment feature during HGA assembly. For example, in the embodiment of FIG. 3, standoff 224 is optionally circular in shape.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

I claim:

1. A head-gimbal assembly (HGA) comprising:
    a head including
        a slider having a leading end and a trailing end that define a slider length, and
        a read transducer disposed at the trailing end;
    a flexure tongue; and
    an adhesive material adhering the head to the flexure tongue;
    wherein the flexure tongue includes no fewer than and no more than three stand-offs in contact with the slider, each of the three stand-offs comprising a dielectric material and spanning a stand-off length that is one-half the slider length or less, two of the three stand-offs being disposed adjacent the leading end,
    wherein the adhesive material is an epoxy material that cures faster when exposed to ultraviolet light, and
    wherein one of the three stand-offs is disposed approximately mid-way between the leading end and the trailing end and is circular in shape.

2. The HGA of claim 1 wherein the flexure tongue further includes at least one through-hole.

3. The HGA of claim 1 wherein the dielectric material comprises polyimide.

4. The HGA of claim 1 wherein the flexure tongue comprises stainless steel.

5. A head-gimbal assembly (HGA) comprising:
- a head including
  - a slider having a leading end and a trailing end that define a slider length, and
  - a read transducer disposed at the trailing end;
- a flexure tongue; and
- an adhesive material adhering the head to the flexure tongue;
- wherein the flexure tongue includes no fewer than and no more than three stand-offs in contact with the slider, each of the three stand-offs comprising a dielectric material and spanning a stand-off length that is one-half the slider length or less, two of the three stand-offs being disposed adjacent the leading end,
- wherein the adhesive material is an epoxy material that cures faster when exposed to ultraviolet light, and
- wherein each of the three stand-offs comprises a dielectric layer and a conductive layer.

6. The HGA of claim 5 wherein the conductive layer comprises copper.

* * * * *